United States Patent
Strecker et al.

(10) Patent No.: US 9,694,336 B2
(45) Date of Patent: Jul. 4, 2017

(54) METHOD FOR COOLING A GAS-PHASE REACTOR FOR THE POLYMERIZATION OF OLEFINS

(71) Applicant: Basell Polyolefine GmbH, Wesseling (DE)

(72) Inventors: Holger Strecker, Weilerswist (DE); Manfred Hecker, Neustadt Wied (DE); Rainer Karer, Kaiserslautern (DE); Axel Hamann, Kerpen (DE); Paulus-Petrus Maria De Lange, Wesseling (DE)

(73) Assignee: Basell Polyolefine GmbH, Wesseling (DE)

( * ) Notice: Subject to any disclaimer, the term of this patent is extended or adjusted under 35 U.S.C. 154(b) by 127 days.

(21) Appl. No.: 14/406,856

(22) PCT Filed: Jun. 13, 2013

(86) PCT No.: PCT/EP2013/062236
§ 371 (c)(1),
(2) Date: Dec. 10, 2014

(87) PCT Pub. No.: WO2013/186299
PCT Pub. Date: Dec. 19, 2013

(65) Prior Publication Data
US 2015/0112038 A1      Apr. 23, 2015

Related U.S. Application Data

(60) Provisional application No. 61/659,753, filed on Jun. 14, 2012.

(30) Foreign Application Priority Data

Jun. 14, 2012  (EP) ..................... 12171911

(51) Int. Cl.
*B01J 8/18* (2006.01)
*G05D 7/00* (2006.01)
(Continued)

(52) U.S. Cl.
CPC .......... *B01J 8/1836* (2013.01); *B01J 8/1809* (2013.01); *C08F 10/02* (2013.01); *G05D 7/0652* (2013.01);
(Continued)

(58) Field of Classification Search
CPC . G05D 7/0652; G05D 23/1931; B01J 8/1836; B01J 2208/00256; C08F 2/34
(Continued)

(56) References Cited

U.S. PATENT DOCUMENTS 4,011,382 A * 3/1977 Levine et al. ........ C08F 210/16
526/106
5,329,965 A   7/1994 Gordon
(Continued)

FOREIGN PATENT DOCUMENTS

DE     4216075 A1    11/1993
DE     1972447 A1    12/1998
(Continued)

OTHER PUBLICATIONS

PCT International Search Report & Written Opinion mailed Oct. 29, 2013, for PCT/EP2013/062236.

*Primary Examiner* — Fred M Teskin

(57) ABSTRACT

A method for controlling the temperature in a polymerization reactor equipped with a cycle gas line for withdrawing reactor gas from the reactor, leading the reactor gas through a heat-exchanger, which is cooled by a cooling medium, which is conveyed in a cooling system through the heat-exchanger, and feeding the reactor gas back to the reactor by adjusting the temperature of the cooling medium entering (Continued)

the heat exchanger, wherein the temperature of the cooling medium entering the heat exchanger is controlled by adjusting the flow rate of the cooling medium in a part of the cooling system by a flow control system comprising two continuously operating flow control devices of different size, which are connected in parallel, a process for polymerizing olefins and a process for controlling the flow rate of a fluid medium.

11 Claims, 2 Drawing Sheets

(51) Int. Cl.
*G05D 23/00* (2006.01)
*C08F 2/34* (2006.01)
*C08F 10/02* (2006.01)
*G05D 7/06* (2006.01)
*G05D 23/19* (2006.01)
*C08F 110/02* (2006.01)
*C08F 210/16* (2006.01)

(52) U.S. Cl.
CPC . *G05D 23/1931* (2013.01); *B01J 2208/00256* (2013.01); *C08F 110/02* (2013.01); *C08F 210/16* (2013.01)

(58) Field of Classification Search
USPC .............................. 526/68; 422/109; 165/296
See application file for complete search history.

(56) References Cited

U.S. PATENT DOCUMENTS 6,165,418 A * 12/2000 Anderson et al. ..... B01J 8/1809
422/109
2008/0033121 A1* 2/2008 Markel et al. .......... C08F 10/00
526/61

FOREIGN PATENT DOCUMENTS

| WO | WO86/05291 A1 | 9/1986 |
| WO | WO95/12788 A1 | 5/1995 |
| WO | WO00/00875 A1 | 1/2000 |
| WO | WO2005/061554 A1 | 7/2005 |

* cited by examiner

METHOD FOR COOLING A GAS-PHASE REACTOR FOR THE POLYMERIZATION OF OLEFINS

This application is the U.S. National Phase of PCT International Application PCT/EP2013/062236, filed Jun. 13, 2013, claiming benefit of priority to European Patent Application No. 12171911.6, filed Jun. 14, 2012, and claiming benefit of priority under 35 U.S.C. §119(e) of U.S. Provisional Application No. 61/659,753, filed Jun. 14, 2013, the contents of which are incorporated herein by reference in their entirety.

FIELD OF THE INVENTION

The present invention relates to a method for controlling the temperature in a polymerization reactor equipped with a cycle gas line for withdrawing reactor gas from the reactor, leading it through a heat-exchanger and feeding it back to the reactor by adjusting the temperature of the cooling medium entering the heat exchanger. It further relates to a process for polymerizing olefins comprising feeding at least one olefin and at least one polymerization catalyst to a polymerization reactor equipped with a cycle gas line for withdrawing reactor gas from the reactor, leading it through a heat-exchanger and feeding it back to the reactor, wherein the temperature in the polymerization reactor is controlled by such a method and it relates to a process for controlling the flow rate of a fluid medium by a flow control system comprising two continuously operating flow control devices of different size, which are connected in parallel.

BACKGROUND OF THE INVENTION

Gas-phase polymerization processes are economical processes for producing polymers. Such processes can, in particular, be carried out in gas-phase fluidized-bed reactors, in which the polymer particles are kept in a fluidized state by means of an appropriate gas stream. To operate a gas-phase fluidized-bed reactor for the production of polyolefins, a very stable temperature control is critical. Otherwise oscillations in the reactor temperature could influence the polymerization behavior of the catalyst and not only eventually result in off-spec production but could also bring about difficulties in operating the reactor like, for example, lump formation or fouling in the reactor, or even shut-down of the reactor. Accordingly, to allow stable polymerization the reactor temperature should be kept within a narrow temperature window. Such a narrow temperature window is especially important for catalyst systems, which show high temperature sensitivity in their polymerization behavior like chromium-based catalysts or mixed catalyst systems.

A typical reactor set-up for a gas-phase fluidized-bed reactor for the production of polyolefins provides a closed loop for the reactor gas, in which the gas is fed in at the lower end of the reactor and taken off again at the upper end of the reactor. The withdrawn reactor gas is passed through a heat exchanger and a compressor and then recirculated to the reactor. The velocity of the reactor gas has to be sufficiently high, firstly to fluidize the bed of polymer particles and secondly to remove the heat of polymerization effectively.

Thus, to be able to react promptly to spontaneous or intended temperature changes in the reactor, it is needed to have a fast working control method for adjusting the temperature of the circulating gas. EP 516 036 A2 discloses a regulation method in which not the full amount of the circulating gas is passed through the heat exchanger but only a part of it. The ratio of the part which bypasses the heat exchanger and the part which flows through the heat exchanger can be controlled in response to the temperature in the reactor. Furthermore, also the temperature of the cooling medium can be controlled by partly recirculating the heated cooling medium leaving the heat exchanger back to the heat exchanger. For improving the response time of the cooling system, WO 00/00875 also suggests a method for controlling the temperature of the polymerization process by adjusting the temperature of the cooling medium entering the heat exchanger.

Although such cooling systems allow operating a gas-phase fluidized-bed reactor for the production of polyolefins, there is still a desire to improve the stability of the temperature in the reactor.

Thus, it was the object of the present invention to overcome the disadvantages of the prior art and to find a cooling method for the cycle gas which works with a shorter response time and a high accuracy in maintaining the reactor temperature. Accordingly the method allows carrying out the polymerization at a temperature very close to the melting point of the produced polyolefins if desired.

SUMMARY OF THE INVENTION

We have found that this object is achieved by a method for controlling the temperature in a polymerization reactor equipped with a cycle gas line for withdrawing reactor gas from the reactor, leading the reactor gas through a heat-exchanger which is cooled by a cooling medium which is conveyed in a cooling system through the heat-exchanger, and feeding the reactor gas back to the reactor by adjusting the temperature of the cooling medium entering the heat exchanger, wherein the temperature of the cooling medium entering the heat exchanger is controlled by adjusting the flow rate of the cooling medium in a part of the cooling system by a flow control system comprising two continuously operating flow control devices of different size, which are connected in parallel.

Furthermore, we have found a process for polymerizing olefins comprising feeding at least one olefin and at least one polymerization catalyst to a polymerization reactor equipped with a cycle gas line for withdrawing reactor gas from the reactor, leading it through a heat-exchanger for cooling and feeding it back to the reactor, polymerizing the olefins in the presence of the polymerization catalyst and withdrawing the obtained polyolefin from the polymerization reactor, wherein the temperature in the polymerization reactor is controlled by such a method and we have found a process for controlling the flow rate of a fluid medium by a flow control system comprising two continuously operating flow control devices of different size, which are connected in parallel, wherein the flow control system is controlled by a controller combination comprising a controller controlling the smaller flow control device and a controller controlling the larger flow control device, in which the output of the controller controlling the smaller flow control device is not only fed to the smaller flow control device but also twice to the controller controlling the larger flow control device, once directly as actual value of the controller controlling the larger flow control device and once, after having passed a limiting device, which limits a signal to a centered range, as setpoint of the controller controlling the larger flow control device.

BRIEF DESCRIPTION OF THE DRAWINGS

The features and advantages of the present invention can be better understood via the following description and the accompanying drawings which show schematically two preferred set-ups for cooling the cycle gas of a fluidized-bed reactor for preparing polyolefins according to the method of the present invention.

DETAILED DESCRIPTION OF THE INVENTION

Figure 1:
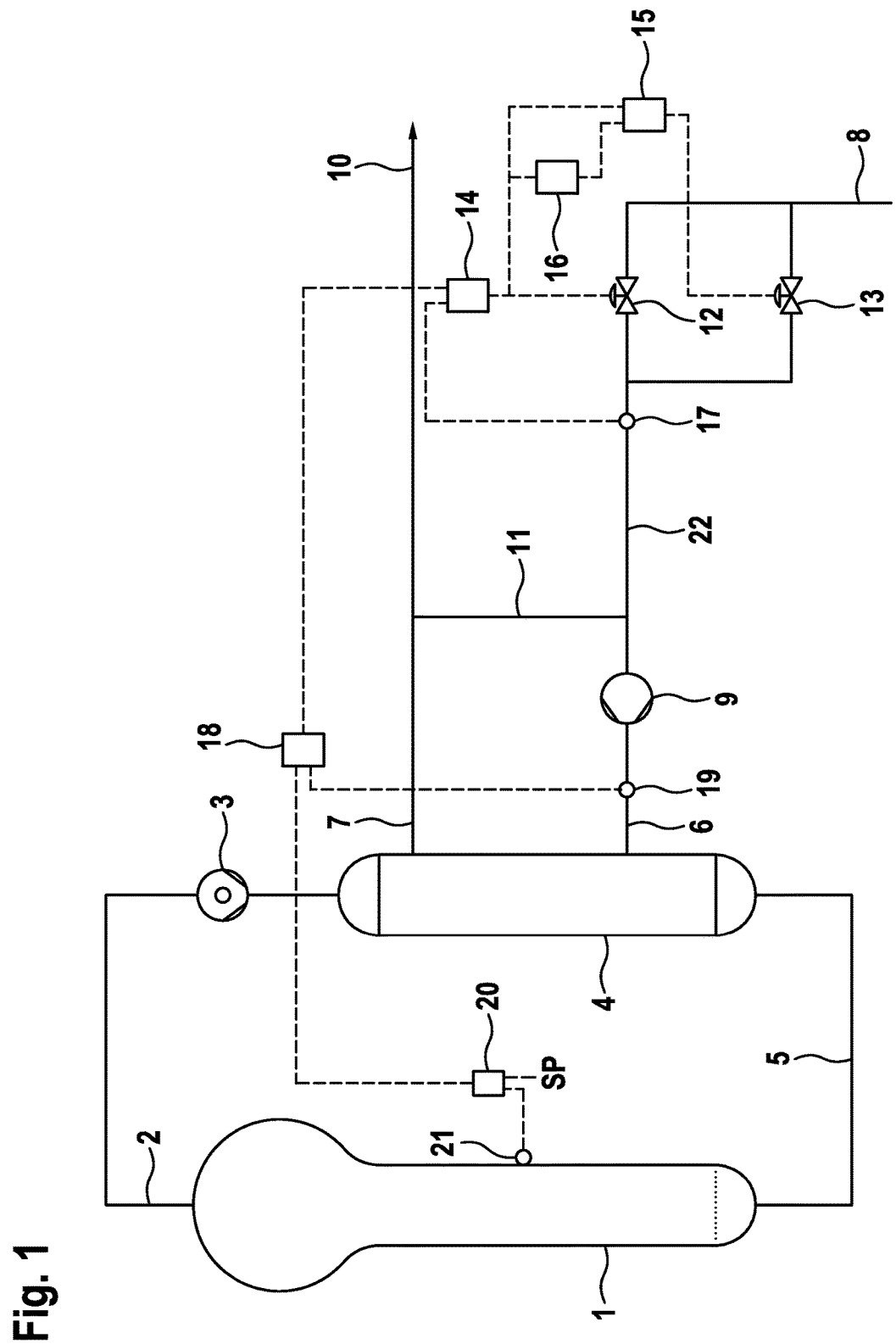
FIG. 1 and FIG. 2 show schemes for set-ups for cooling the cycle gas of a fluidized-bed reactor for preparing polyolefins.

The method of the present invention refers to controlling the temperature in a polymerization reactor equipped with a cycle gas line for withdrawing reactor gas from the reactor, leading it through a heat-exchanger for cooling and feeding it back to the reactor. Suitable polymerization reactions which can be controlled by the present method are all exothermic polymerization reactions which can be cooled by withdrawing gas from the reactor, cooling it in a heat-exchanger and feeding it back to the reactor. Examples of such polymerization reactions are polymerizations of olefinic monomers like 1-olefins or halogenated olefins such as tetrafluoroethylene or vinyl chloride.

Preferred polymerizations reactions are polymerizations reactions for the polymerization of 1-olefins, i.e. hydrocarbons having terminal double bonds, without being restricted thereto. Suitable monomers can be functionalized olefinically unsaturated compounds such as ester or amide derivatives of acrylic or methacrylic acid, for example acrylates, methacrylates, or acrylonitrile. Preference is given to non-polar olefinic compounds, including aryl-substituted 1-olefins. Particularly preferred 1-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various 1-olefins. Suitable olefins also include ones in which the double bond is part of a cyclic structure which can have one or more ring systems. Examples are cyclopentene, norbornene, tetracyclododecene or methylnorbornene or dienes such as 5-ethylidene-2-norbornene, norbornadiene or ethylnorbornadiene. It is also possible to polymerize mixtures of two or more olefins. The reactions can be used in particular for the homopolymerization or copolymerization of ethylene or propylene and is especially preferred for polymerizing ethylene or ethylene and one or more other olefins. As comonomers in ethylene polymerization, preference is given to using up to 40 wt.-% of $C_3$-$C_8$-1-alkenes, in particular 1-butene, 1-pentene, 1-hexene and/or 1-octene. Preferred comonomers in propylene polymerization are up to 40 wt.-% of ethylene and/or butene. Particular preference is given to a process in which ethylene is copolymerized with up to 20 wt.-% of 1-hexene and/or 1-butene.

Suitable reactors are, for example, stirred gas-phase reactor, multizone gas-phase reactors, or gas-phase fluidized-bed reactors. Reactors of these types are generally known to those skilled in the art. Stirred gas-phase reactors can for example be horizontally or vertically stirred. Common multizone gas-phase reactors comprise two gas-phase polymerization zones, which are linked to one another and the polymer is passed alternately a plurality of times through these two zones, with the two zones also being able to have different polymerization conditions. Such reactors are described, for example, in WO 97/04015 and WO 00/02929.

Preferably the reactor is a fluidized-bed reactor, i.e. a reactor comprising a bed of polymerizing polymer particles which are kept in fluidized state by introducing a gas from below. This gas is then usually taken off at the upper end of the reactor, cooled to remove the heat of polymerization and recirculated back into the reactor at its lower end. When such a process is employed for the polymerization of olefins, the circulated reactor gas is usually a mixture of the olefin to be polymerized, inert gases such as nitrogen and/or lower alkanes such as ethane, propane, butane, pentane or hexane and optionally a molecular weight regulator such as hydrogen. The use of nitrogen or propane as inert gas, if appropriate in combination with further lower alkanes, is preferred. The polymerization can also be carried out in a condensing or super-condensing mode, in which part of the circulating gas is cooled to below the dew point and returned to the reactor separately as a liquid and a gas phase or together as a two-phase mixture in order to make additional use of the enthalpy of vaporization for cooling the reaction gas.

For polymerizing in such reactors, it is common to work at pressures of from 0.1 to 10 MPa, preferably from 0.5 to 8 MPa and in particular from 1.0 to 3 MPa. The polymerization is advantageously carried out at temperatures of from 30 to 160° C., particularly preferably from 65 to 125° C. For the polymerization of ethylene or ethylene with one or more other olefins, temperatures in the upper part of this range are preferred for preparing ethylene homopolymers or copolymers of relatively high density and temperatures in the lower part of this range are preferred for preparing ethylene copolymers of lower density. The method of the present invention allows controlling the temperature in the polymerization reactor very precisely. Preferably the variation of the polymerization temperature is less then ±2° C., more preferably less than ±1° C., especially less than ±0.5° C. and in particular less than ±0.2° C.

The polymerization of olefins can be carried out using all customary olefin polymerization catalysts. That means the polymerization can be carried out using Phillips catalysts based on chromium oxide, using titanium-based Ziegler- or Ziegler-Natta-catalysts, or using single-site catalysts. Single-site catalysts have to be understood as being catalysts based on chemically uniform transition metal coordination compounds. Particularly suitable single-site catalysts are those comprising bulky sigma- or pi-bonded organic ligands, e.g. catalysts based on mono-Cp complexes, catalysts based on bis-Cp complexes, which are commonly designated as metallocene catalysts, or catalysts based on late transition metal complexes, in particular iron-bisimine complexes. Furthermore, it is also possible to use mixtures of two or more of these catalysts for the polymerization of olefins. Such mixed catalysts systems are sometimes also designated as hybrid catalysts.

The method of the present invention is especially suitable for catalysts, which are sensitive in their polymerization behavior, that means for catalysts for which relatively small changes in the polymerization temperature result in significant changes in the properties of the obtained polymers, such as, e.g., chromium-based catalysts or a mixed catalyst systems.

Examples of suitable chromium-based catalysts are catalysts of the Phillips type, which are preferably prepared by applying a chromium compound to an inorganic support and subsequently calcinating this at temperatures in the range from 350° C. to 950° C., resulting in chromium present in valences lower than six being converted into the hexavalent state. Apart from chromium, further elements such as magnesium, calcium, boron, aluminum, phosphorus, titanium, vanadium, zirconium or zinc can also be used. Particular preference is given to the use of titanium, zirconium or zinc. Combinations of the abovementioned elements are also possible. The catalyst precursor can be doped with fluoride prior to or during calcination. As supports for Phillips catalysts, which are also known to those skilled in the art, mention may be made of aluminum oxide, silicon dioxide (silica gel), titanium dioxide, zirconium dioxide or their mixed oxides or cogels, or aluminum phosphate. Further suitable support materials can be obtained by modifying the pore surface area, e.g. by means of compounds of the elements boron, aluminum, silicon or phosphorus. Preference is given to using a silica gel. Preference is given to spherical or granular silica gels, with the former also being able to be spray dried. The activated chromium catalysts can subsequently be prepolymerized or pre-reduced. The pre-reduction is usually carried out by means of carbon monoxide or else by means of hydrogen at 250° C. to 500° C., preferably at 300° C. to 400° C., in an activator.

Suitable mixed catalyst systems are catalyst systems which have at least two different types of active sites derived from at least two chemically different starting materials. The different active sites can be active sites which are comprised in various single-site catalysts. However, it is also possible to use active sites which are derived from Ziegler-Natta catalysts or catalysts based on chromium, e.g. Phillips catalysts. The method of the present invention is especially suitable for mixed catalyst systems comprising late transition metal complexes, in particular iron-bisimine complexes, and at least one further mono-cp or bis-cp metallocene or a Ziegler catalyst.

The method of the present invention refers to controlling the temperature in a polymerization reactor, which is cooled by passing the reactor gas through a heat-exchanger located in a cycle gas line. Since the polymerization reaction is usually exothermic, the temperature in the reactor is thus controlled by the amount of heat removed from the reactor via the heat exchanger. For varying the heat removal, provided that the flow rate of the cycle gas in the cycle gas line remains constant, there exist in principle two methods for controlling the temperature in a polymerization reactor. It is either possible to change the flow rate of the cooling medium passing the heat exchanger or it is possible to vary the temperature of the cooling medium. Varying the flow rate of the cooling medium has however the disadvantage that it requires a relatively long time to change the flow rate and furthermore a variation of the flow rate does not linearly influence the heat removal especially if the flow rate becomes low. Accordingly, accuracy and stability of such a controlling method are not sufficient. The amount of heat removed from the reactor is therefore preferably primarily controlled by varying the temperature of the cooling medium entering the heat exchanger and maintaining the flow rate of the cooling medium at a constant high flow rate at which the heat exchanger operates in its optimal heat removal range. Accordingly, the present invention refers to a method which allows varying the temperature of the cooling medium with a short response time and a high accuracy, however retaining a high flow rate of the cooling medium.

The cooling medium of the present invention can be any conventional fluid suitable for being operated in a temperature range of from 10° C. to 160° C. Preferably the cooling medium is a liquid and more preferably water. If water is used as cooling medium the cooling system is preferably operated at a pressure of from 0.1 to 1 MPa, more preferably to from 0.2 to 0.6 MPa, to avoid boiling of the water. Depending on the polymerization conditions, the temperature at which the cooling medium is fed to the heat-exchanger of the cycle gas line may be selected differently. In steady state, the appropriate temperature depends, for example, on the amount of heat, which needs to be removed from the reactor, and is therefore, inter alia, determined by the production rate and the produced polymer type. Suitable temperatures for the cooling medium to be fed to the heat-exchanger of the cycle gas line can be in the range of from 30 to 70° C. For starting-up the reactor, it is however also possible to use the cooling medium as heating medium if the cooling system is provided with a means for heating the cooling fluid. Such a heating of the cycle gas assists in bringing the reactor to the desired polymerization temperature if the polymerization reaction has not yet fully started.

According to the present invention, the temperature of the cooling medium is controlled by varying the flow rate of the cooling medium in a part of the cooling system by a flow control system comprising two continuously operating flow control devices of different size which are connected in parallel. A measure for the size of the flow control devices is the maximum flow rate through that device. Preferably the ratio of the maximum flow rate through the larger flow control device to the maximum flow rate through the smaller flow control device is in the range of from 3:1 to 20:1, more preferably in the range of from 5:1 to 15:1 and especially in the range of from 8:1 to 12:1. By using continuously operating flow control devices of different size it is possible to adjust the flow rate very precisely over the whole range of possible flow rates with a short response time; that means the flow rate can be adjusted with the same high precision at all flow rates from nearly zero flow to the maximum flow rate, i.e. the flow rate for a situation in which the larger flow control device is fully opened and the smaller flow control device operates at the maximum of its controlling range. The larger flow control device allows varying the flow rate continuously in a wide range while the smaller flow control device brings about the exact control of the flow rate. Preferably the flow distribution between the two flow control devices is selected in a way that, in steady state, the opening of the smaller flow control device is always working in an optimal controlling range, i.e. the opening is preferably in a range of from 30% to 80% and more preferably in a range of from 35% to 75%.

Suitable continuously operating flow control devices are, for example, control valves and preferably segmented ball-valves or, for bigger dimensions, butterfly valves.

For maintaining an essentially constant flow rate of the cooling medium through the heat exchanger it is preferred to recirculate a part of the warmed cooling medium leaving the heat exchanger directly back to the heat exchanger, that means feeding it back to the heat exchanger without taking any measures to change its temperature. Accordingly, the temperature of the cooling medium entering the heat exchanger depends on the temperature of the newly provided cooling medium, the temperature of the recirculated warmed cooling medium and their mixing ratio.

In a preferred embodiment of the present invention, the cooling medium is provided from an outside source and the cooling medium is conveyed through the heat exchanger of the cycle gas line by a pump, preferably a centrifugal pump, and fully allowed to recirculate back to the heat exchanger. In such a case, the flow rate of the cooling medium through the heat exchanger is determined by the characteristic of the pump circulating the cooling medium. The temperature of the circulating cooling medium is reduced by adding fresh cooling medium. The amount of newly provided cold cooling medium, which is fed to the inlet of the pump circulating the cooling medium, is controlled by the flow control system of the present invention. Accordingly, adjusting the flow rate of newly provided cooling medium to the intake of the pump controls the mixing ratio of newly provided and recirculated cooling medium and so adjusts the temperature of the cooling medium entering the heat exchanger.

In another preferred embodiment of the present invention, the cooling medium cooling the heat exchanger circulates in a closed loop as secondary cooling system which is cooled by means of a heat-exchanging device, which is cooled by a cooling medium of a primary cooling system. Suitable heat-exchanging devices are, for example, plate heat exchangers. Preferably, the heat-exchanging device cooling the secondary cooling system comprises two heat-exchangers, which are connected in parallel. Thus, it is for example possible to clean one of the heat-exchangers without being forced to stop the polymerization reaction. In this embodiment of the present invention, the flow control system controls the flow rate of the cooling medium of the secondary cooling system through the heat-exchanging devices cooling the secondary cooling system. By varying the flow rate of the cooling medium of the secondary cooling system through the heat-exchanging devices cooling the secondary cooling system the temperature of the cooling medium leaving the heat-exchanging devices cooling the secondary cooling system changes and thus the temperature of the cooling medium entering the heat exchanger of the cycle gas line can be adjusted. For retaining a high flow rate of the cooling medium in the heat exchanger of the cycle gas line, a part of the warmed cooling medium leaving the heat exchanger of the cycle gas line is directly recirculated back to the heat exchanger without passing the heat-exchanging devices cooling the secondary cooling system. Preferably the ratio of the two streams of the cooling medium of the secondary cooling system, the one directly recirculated and the one passing the heat-exchanging devices cooling the secondary cooling system is controlled by controlling the flow rate of the recirculating stream.

The flow control system adjusting the flow rate of the cooling medium preferably operates based on temperature data measured in the cooling medium entering the heat exchanger of the cycle gas line and on temperature data measured in the polymerization reactor. Preferably a cascade control is used. A controller controlling the reactor temperature provides a setpoint to a controller controlling the temperature of the cooling medium entering the heat exchanger of the cycle gas line, which controller in turn provides a setpoint to the flow control system adjusting the flow rate of the cooling medium. The temperature value used to control the reactor temperature is preferably not the result of a single measurement but a mean value of more than one measurement, preferably a mean value of from 3 to 5 measurements. If the polymerization reactor is a fluidized-bed reactor the temperature measurements are preferably all carried out at the same height of the reactor, preferably in equal distances from each other, and the reactor temperature is preferably measured via lances which extend into the reactor, that means the measuring points are within the reactor and in a certain distance from the reactor wall. In a further preferred embodiment, it can be implemented that the control parameters of the flow control system may vary depending on the actual polymerization rate and accordingly on the heat which needs to be removed from the reactor. In such a case, the control characteristic of the controller providing the setpoint to the flow control system is dynamic.

If the polymerization reactor is operated with a relatively low polymerization rate and a relatively low amount of heat has to be removed, the gain of the controller is selected to be relatively low. If the polymerization reactor is operated with a higher polymerization rate and a higher amount of heat has to be removed, the gain of the controller is selected to be more aggressive. Consequently, the setpoint of the controller controlling the small flow control device is provided by a controller of which the gain is varied depending on the polymerization rate in the polymerization reactor.

The flow control system adjusting the flow rate of the cooling medium further operates on data of the flow passing through the flow control devices which are fed as actual value to the flow control system. The relevant parameter is the total flow rate of the cooling medium passing the flow control system. It is accordingly possible to solely measuring at one place the flow rate of the cooling medium after the two streams through the smaller and the larger flow control device have been combined. It is however also possible to measure individually the flows of both part streams, the one through the smaller flow control device and the one through the larger flow control device, and use a combination of the two measured values as actual value, which is fed to the flow control system for adjusting the flow rate of the cooling medium.

In a preferred embodiment of the present invention the flow control system of the two continuously operating flow control devices of different size is controlled by a controller combination comprising a controller controlling the smaller flow control device and a controller controlling the larger flow control device. The output of the controller controlling the smaller flow control device is not only fed to the smaller flow control device but also twice to the controller controlling the larger flow control device, once directly as an actual value of the controller controlling the larger flow control device and once again, after having passed a limiting device, as setpoint of the controller controlling the larger flow control device. The limiting device limits the signal fed as input to the limiting device to a centered range. That means, the input signal, which can vary from 0% corresponding to a fully closed smaller flow control device to 100% corresponding to a fully open smaller flow control device, is limited to a smaller centered range from a lower limit value to a higher limit value. If the input signal is within this range from the lower limit value to the higher limit value the signal remains unchanged and the output of the limiting device is identical to the input. If the input signal is in the range of from 0% to the lower limit value the output of the limiting device is identical to the lower limit value and if the input signal is in the range of from the higher limit value to 100% the output of the limiting device is identical to the higher limit value. Preferably the centered range covers the range of from 30% to 80% and more preferably of from 35% to 75%. As long as the output of the controller controlling the smaller flow control device is within the centered range of the limiting device, the actual value and the set point of the controller controlling the larger flow control device are identical and the only variation of the flow rate of the cooling medium is caused by varying the opening of the smaller flow control device. Consequently the control can take place very precisely. Only if the output of the controller controlling the smaller flow control device is outside the centered range of the flow limiting device the controller controlling the larger flow control device provides an output value that causes a change in the opening of the larger flow control device. Preferably the changing of the opening of the larger flow control device is set to occur slowly.

FIG. 1 shows a scheme for a feasible set-up for cooling the cycle gas of a fluidized-bed reactor for preparing polyolefins according to the method of the present invention. The polymerization set-up comprises the actual reactor (1), in which the polymerization takes place, a cycle gas line (2) for withdrawing reactor gas from the reactor, a compressor (3), a heat exchanger (4) and a cycle gas line (5) for feeding the cycle gas back to reactor (1). The cooling of the cycle gas occurs in heat exchanger (4).

For cooling heat exchanger (4), a cooling medium, preferably water, is fed to the heat exchanger via line (6) and withdrawn from heat exchanger (4) via line (7). The cooling medium comes from a cooling medium supply line (8), passes a pump (9), which is preferably a centrifugal pump, and is discharged through a cooling medium discharge line (10). A part of the cooling medium may be led along line (11) from line (7) through pump (9) to line (6) and accordingly back to heat exchanger (4) forming a cycling flow. Pump (9) is operated in a way that the flow rate of the cooling medium through heat exchanger (4) is kept essentially constant. Line (11) can further be equipped with a heat exchanger (not shown) to heat the polymerization reactor for starting-up polymerization. Such a heat exchanger is preferably heated by steam.

The amount of fresh cooling medium entering the cooling system via line (8) is controlled by two continuously operating control valves (12) and (13), which are connected in parallel. According to the method of the present invention, valves (12) and (13) are of different size, where valve (12) is smaller than valve (13). Preferably the ratio of the sizes of valves (13) and (12), expressed as the ratio of the maximum flow rates through valves (13) and (12), is in the range of from 8:1 to 12:1. The two valves (12) and (13) are controlled by two controllers (14) and (15), which form together with limiting device (16) a controller combination for controlling the flow rate of the cooling medium through line (8).

Controller (14) controls the smaller valve (12) directly based on the information of the flow rate measured by flow meter (17). In an alternative set-up (not shown) it is also possible to measure separately the flow rates exiting valves (12) and (13) and feed the sum of the values as actual value to controller (15). The setpoint of controller (14) is provided by the output of controller (18) based on the temperature data of the cooling medium entering the heat exchanger measured in temperature measuring device (19). The setpoint of controller (18) is further provided by the output of reactor controller (20) based on the temperature data of the reactor measured by at least one temperature measuring device (21). Preferably however, more than one temperature measuring device (21) is used for measuring the temperature into the reactor and, e.g., the average of the measured values is transmitted as actual value to controller (18). In a preferred embodiment, the gain of controller (18) is not set to a fixed value but is varied depending on the actual polymerization rate in reactor and accordingly on the heat to be removed from the reactor.

Valve (13) is controlled by controller (15), which in turn is controlled by controller (14). For this, the output value of controller (14) is not only fed to valve (12) but also to limiting device (16) and, as actual value, to controller (15). The setpoint of controller (15) is provided by the output of limiting device (16).

Limiting device (16) has the function of limiting an input value to a centered range. If the input value is within the boundaries of this range the signal passes limiting device (16) unchanged. If the input value exceeds the upper boundary the output value of limiting device (16) is set to the value of the upper boundary and if the input value is below the lower boundary the output of limiting device (16) is set to the value of the lower boundary. Thus, if the output of controller (14) is within the centered range of limiting device (16) the setpoint and the actual value of controller (15) are identical and consequently the position of the valve (13) stays at the position where it is. If the output of controller (14) is above the upper boundary of the centered range of limiting device (16) the actual value fed to controller (15) differs from its setpoint and controller (15) modifies its output with the aim to open valve (13) slowly. This has the effect that the total flow in line (22) slowly increases forcing the controller (14) to lower its output value until the upper boundary of the centered range of limiting device (16) is reached and consequently the actual value and the setpoint fed to controller (15) become identical again. Similarly, controller (15) modifies its output with the aim to close valve (13) if the output of controller (14) is below the lower boundary of the centered range of limiting device (16) because also in this situation the actual value fed to controller (15) and its setpoint differ. With decreasing flow in line (22) controller (14) raises its output value until the lower boundary of the centered range of limiting device (16) is reached again.

Figure 2:
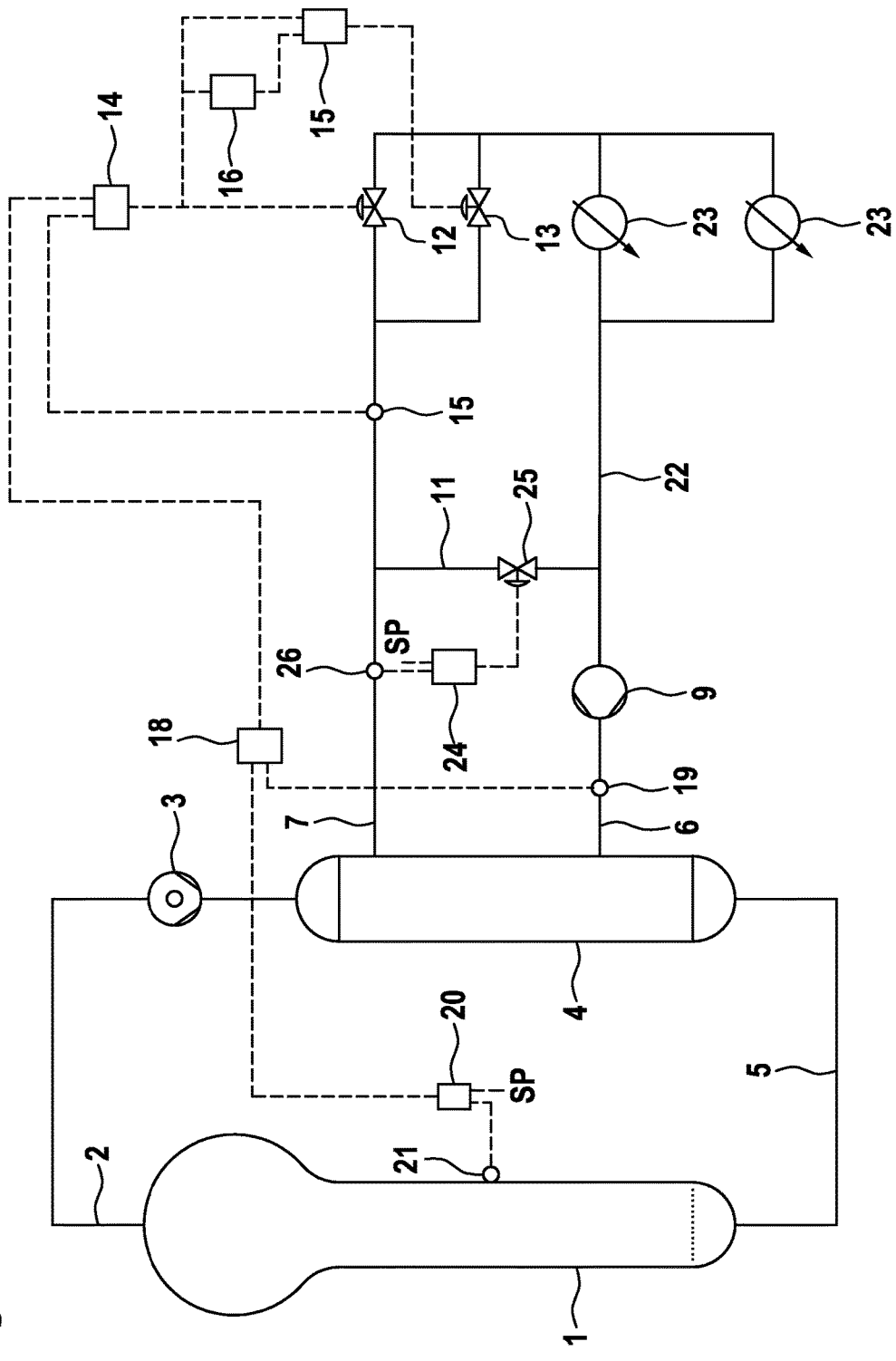

FIG. 2 shows a scheme for a further preferred set-up for cooling the cycle gas of a fluidized-bed reactor for preparing polyolefins according to the method of the present invention. The set-up differs from the configuration shown in FIG. 1 in that heat exchanger (4) is not directly cooled by a cooling medium entering the cooling system for cooling heat exchanger (4) via line (8) but it is cooled by a secondary cooling system which circulates a cooling medium in a closed loop. The cooling medium, preferably water, is itself cooled by two heat exchangers (23), preferably plate heat exchangers, which are connected in parallel and are cooled by a primary secondary cooling system (not shown). To maintain a constant high flow rate of the cooling medium of the secondary cooling medium through heat exchanger (4), the flow rate of the cooling medium through line (11) is controlled by a controller (24) via a valve (25) based on the information of the flow through heat exchanger (4) measured by a flow meter (26).

The mode of operation of the two continuously operating control valves (12) and (13) and the controller combination of controllers (14) and (15) and limiting device (16) is identical to that of FIG. 1. Furthermore, also in this setup, line (11) can further be equipped with a heat exchanger (not shown) to heat the polymerization reactor for starting-up polymerization. Such a heat exchanger is preferably heated by steam.

The present invention further refers to a process for polymerizing olefins comprising feeding at least one olefin, preferably ethylene or a mixture of ethylene and one or more other olefins, and at least one polymerization catalyst, preferably a chromium-based catalysts or a mixed catalyst system, to an polymerization reactor equipped with a cycle gas line for with-drawing reactor gas from the reactor, leading it through a heat-exchanger for cooling and feeding it back to the reactor, polymerizing the olefins in the presence of the polymerization catalyst and withdrawing the obtained polyolefin from the polymerization reactor, wherein the temperature in the polymerization reactor is controlled by a method as described above.

The present invention also refers to a process for controlling the flow rate of a fluid medium, preferably a liquid, by a flow control system comprising two continuously operating flow control devices of different size, which are connected in parallel, wherein the flow control system is controlled by a controller combination comprising a controller controlling the smaller flow control device and a controller controlling the larger flow control device, in which the output of the controller controlling the smaller flow control device is not only fed to the smaller flow control device but also twice to the controller controlling the larger flow control device, once directly as actual value of the controller controlling the larger flow control device and once, after having passed a limiting device which limits a signal to a centered range, as setpoint of the controller controlling the larger flow control device. Preferably the setpoint of the controller controlling the larger flow control device is the output of the controller controlling the smaller flow control limited to a range of from 30% to 80% and more preferably of from 35% to 75%. Such a process could be used, for example, for controlling the dosing of fluids or for cooling purposes such as cooling an exothermic reaction or for heating purposes.

What is claimed is:

1. A method for controlling the temperature in a polymerization reactor equipped with a cycle gas line for withdrawing reactor gas from the reactor, leading the reactor gas through a heat-exchanger which is cooled by a cooling medium which is conveyed in a cooling system through the heat-exchanger, and feeding the reactor gas back to the reactor by adjusting the temperature of the cooling medium entering the heat exchanger, wherein the temperature of the cooling medium entering the heat exchanger is controlled by adjusting the flow rate of the cooling medium in a part of the cooling system by a flow control system comprising two continuously operating flow control devices of different size, which are connected in parallel, wherein the flow control system is controlled by a controller combination comprising a controller controlling the smaller flow control device and a controller controlling the larger flow control device, in which the output of the controller controlling the smaller flow control device is not only fed to the smaller flow control device but also twice to the controller controlling the larger flow control device, once directly as actual value of the controller controlling the larger flow control device and once, after having passed a limiting device, which limits a signal to a centered range, as setpoint of the controller controlling the larger flow control device.

2. The method according to claim 1, wherein a part of the cooling medium leaving the heat exchanger is recirculated directly to the heat exchanger.

3. The method according to claim 1, wherein the flow control system is operated in a way that, in steady state, the opening of the smaller flow control device is always in the range of from 30% to 70%, independently of the total flow rate of the cooling medium through the flow control system.

4. The method according to claim 1, wherein the setpoint of the controller controlling the larger flow control device is the output of the controller controlling the smaller flow control limited to a range of from 30% to 80%.

5. The method according to claim 1, wherein the setpoint of the controller controlling the smaller flow control device is provided by a controller of which the gain is varied depending on the polymerization rate in the polymerization reactor.

6. The method according to claim 1, wherein the cooling medium cooling the heat exchanger circulates in a closed loop as secondary cooling system which is cooled by means of a heat-exchanging device, which is cooled by a cooling medium of a primary cooling system.

7. The method according to claim 6, wherein the heat-exchanging device cooling the secondary cooling system comprises two heat-exchangers, which are connected in parallel.

8. The method according to claim 1, wherein the cooling medium is a liquid.

9. The method of claim 1, comprising polymerizing olefins comprising feeding at least one olefin and at least one polymerization catalyst to a polymerization reactor equipped with a cycle gas line for withdrawing reactor gas from the reactor, leading it through a heat-exchanger for cooling and feeding it back to the reactor, polymerizing the olefins in the presence of the polymerization catalyst and withdrawing the obtained polyolefin from the polymerization reactor.

10. The method of claim 9, wherein ethylene or a mixture of ethylene and one or more other olefins is fed to the polymerization reactor.

11. The method of claim 9, wherein the polymerization catalyst is a chromium-based catalyst or a mixed catalyst system.

* * * * *